United States Patent [19]

Reilly et al.

[11] Patent Number: 4,840,556
[45] Date of Patent: Jun. 20, 1989

[54] MIXING PLATE FOR INJECTION MOLDING MACHINE

[75] Inventors: Bernard J. Reilly, Troy; Roger Michels, Utica, both of Mich.

[73] Assignee: Extrusion Punch & Tool Co., Troy, Mich.

[21] Appl. No.: 74,066

[22] Filed: Jul. 16, 1987

[51] Int. Cl.⁴ .............................................. B29C 45/02
[52] U.S. Cl. .................................. 425/543; 264/328.6; 425/557; 425/562; 425/568
[58] Field of Search ...................... 264/328.6; 366/177, 366/189, 338, 340; 425/543, 557, 562, 567, 568

[56] References Cited

U.S. PATENT DOCUMENTS

| | | | |
|---|---|---|---|
| 3,706,515 | 12/1972 | Keuerleber et al. | 425/543 |
| 4,189,070 | 2/1980 | Macosko et al. | 425/143 |
| 4,440,500 | 4/1984 | Schneider | 366/189 |
| 4,647,212 | 3/1987 | Hankison | 366/340 |
| 4,680,003 | 7/1987 | Schulte et al. | 425/543 |

OTHER PUBLICATIONS

Becker, Walter E., "Reaction Injection Molding", 1979, pp. 60, 75–77, and 255–259.

Primary Examiner—Jay H. Woo
Assistant Examiner—C. Scott Bushey
Attorney, Agent, or Firm—Arnold S. Weintraub; William D. Blackman

[57] ABSTRACT

A mixing plate apparatus for use in a conventional reaction injection molding mixing head. The injection molding mixing head has a metering valve system to produce a chemically reactive of at least two fluid reactant streams which are metered into a mixing chamber within the mixing head through an orifice over which is disposed a mixing plate composed of a multi-portal grate. The plate is composed of a plurality of apertures symmetrically disposed thereon. The plate introduces turbulence into the fluid stream as each stream is introduced into the mixing chamber to ensure more efficient mixing with the other fluid stream(s). The reacting mixture is then ejected form the mixing chamber into a desired mold cavity.

4 Claims, 4 Drawing Sheets

MIXING PLATE FOR INJECTION MOLDING MACHINE

BACKGROUND OF THE INVENTION

1. Field of the Invention:

This invention relates to injection molding apparatus. More specifically, this invention relates to mixing heads for combining separate fluid streams prior to entry into a mold cavity.

2. Description of the Prior Art:

In order to form molded plastic parts, a heated plastic material is injected into a mold under pressure where it cools and solidifies to form the molded part or parts. Reaction injection molding (RIM) has become increasingly popular as a low-cost alternative to conventional injection molding processes. This is due to the shorter cycle times inherent in RIM processes.

In reaction injection molding, two or more components are admixed immediately prior to entry into the mold. The components react as they mix to generate a reaction product which gels to conform to the confines of the mold. The reaction product can be a rigid or resilient polymeric material depending upon the formulation used. In RIM processes, one common method of producing the polymeric reaction product is by metering a liquid stream of a polyol pre-mix and an isocyanate stream into a mix head and delivering the combined material into the mold.

The mix head is typically a housing containing a piston movably mounted within a chamber or bore formed in the housing. A rod is mounted on the end of the piston. The rod extends through a second bore formed in the housing. Two inlets and an outlet are formed in the housing in communication with the second bore. Each inlet is connected to a pressurized liquid reactant stream while the outlet is connected to the mold.

The rod selectively opens and closes the inlets to the second bore in the housing. Retraction of the rod permits the liquid reactant material to flow from the inlets through the bore. The reverse movement of the rod closes the bore from the inlets and forces the polyol-isocyanate mixture from the bore into the mold where the polyol-isocyanate mixture reacts to form the desired molded part.

The quality of the resulting polymeric part depends, in large part, on the intimate mixture of the reactants. Inadequate mixing can result in non-uniform gelling characteristics which can weaken the resulting polymer. At the very least, inadequate mixing slows the reaction rate due to inadequate contact between the components.

To ensure proper mixing, aftermixers are sometimes added to the mixing heads of injection molding machines. These devices are placed in or adjacent to the bore or mixing chamber to mix the combined ingredients. One drawback of aftermixers is the tendency of the reacting material to gel and foul the device. This necessitates frequent cleaning and maintenance to ensure maximum efficiency.

Thus, it would be desirable to provide a means for mixing various reactants which does not require a mechanical aftermixer. It is also desirable that the means for mixing be of a type which is resistant to fouling and does not interfere with injection of the polymeric mixture into the mold.

SUMMARY OF THE INVENTION

The present invention is a mixing plate for use in conventional injection molding mixing heads. The injection molding mixing head has a metering valve system which produces a chemically reactive mixture of at least two fluid reactant streams, such as a first fluid stream of a polyol pre-mix and a second fluid stream of an isocyanate or an isocyanate pre-polymer. The fluid streams are metered into a conventional mixing chamber within the mixing head through a mixing plate composed of a multi-portal grate. The grate introduces turbulence into the fluid stream which ensures more efficient mixing. The reacting mixture can then be ejected from the mixing chamber into a desired mold cavity. The mixture takes the form of the mold cavity, reacts, and gels rapidly into a resilient or rigid plastic form depending upon the formulation employed.

The conventional mixing head which can be employed has a housing with a mixing chamber or bore formed in it. A rod is slidably disposed within the mixing chamber. The slidable movement of the rod is actuated by a conventional hydraulic system or other suitable means.

The mixing chamber may be lined with a hollow lining sleeve. The mixing chamber is in fluid flow communication with an outlet. A plurality of orifices are also formed in the sleeve. Various reactant passageways are located in fluid communication with the orifices. When the slidable rod is in the retracted position, the various fluid reactant streams can be conveyed through the reactant passageways into the mixing chamber. The mixed reactant streams can then be conveyed into a mold through the outlet.

In the present invention, the orifices are positioned opposite one another so that simultaneous entry of various pressurized reactant fluids results in immediate contact upon entry into the mixing chamber. Each orifice has a conical configuration such that the narrowest portion is located immediately adjacent to the point of entry into the mixing chamber. A mixing plate composed of a multi-portaled grate is positioned in each orifice, preferably at the narrowest portion of the orifice. The grate introduces turbulence into each reactant pressurized fluid stream upon entry into the mixing chamber to ensure better contact and mixture between the reactant streams. The multi-portal grate can be integrally formed with the hollow sleeve or may be constructed as an individual unit and placed in position within the given orifice.

BRIEF DESCRIPTION OF THE DRAWING

The various features, advantages and other uses of the present invention will become more apparent by referring to the drawings and the following detailed description in which.

DESCRIPTION OF THE PREFERRED EMBODIMENT

Figure 1:
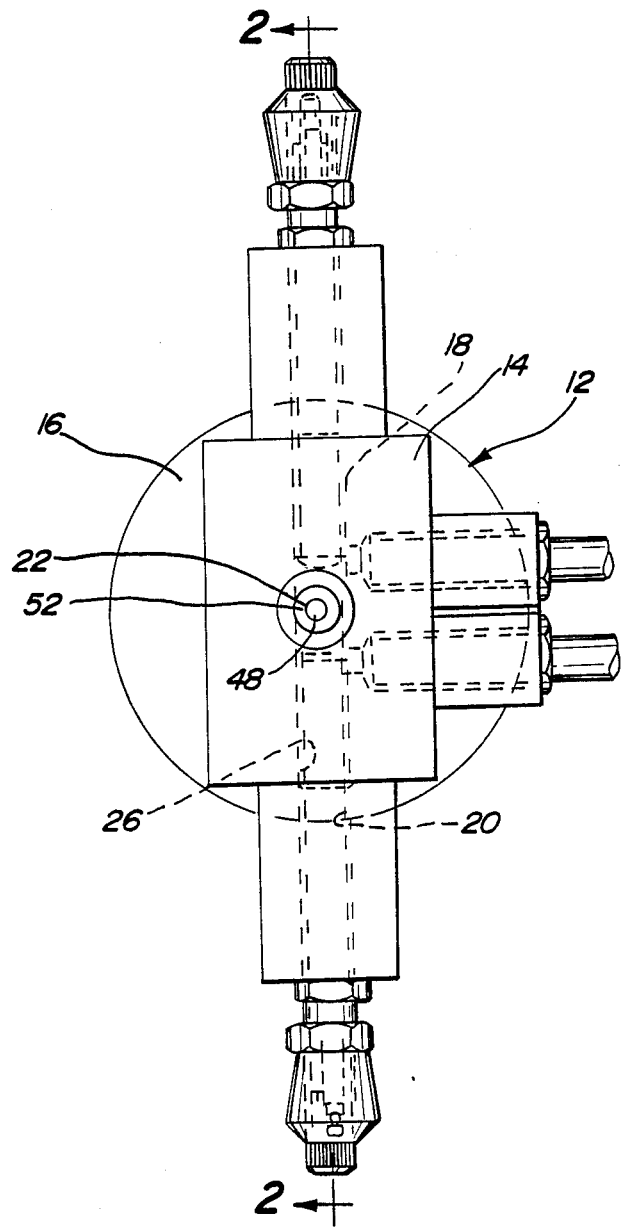
FIG. 1 is an end view of an injection molding and metering valve as can be used with the present invention.

Throughout the following description and in the drawing, an identical reference number is used to refer to the same component shown in multiple figures of the drawing.

Referring now to the drawing and to FIG. 1 in particular, there is illustrated an injection molding mixing head 12 in the form of a body having first and second sections 14 and 16, respectively. The first section 14 of the body 12 has a generally rectangular form with a rectangular cross-section as shown in FIG. 1. The second portion or section 16 of the body 12 has a circular cross-section.

First and second inlets 18 and 20, respectively, are formed in the first section 14 of the body 12. An outlet 22 is also formed in one end of the first portion 14 of the body 12.

A first through bore 28 is formed interiorly within the body 12. The first through bore 28 is formed with a first reduced cross-sectional portion 30 and a second, enlarged cross-sectional portion 32.

A fluid chamber 34 is formed within the body 12 coaxially with the first through bore 28 and lies adjacent to the enlarged cross-sectional section 32 of the first through bore 28. The fluid chamber 34 is provided with an inlet and an outlet 36 and 38, respectively, which provide inlet and discharge passages for pressurized fluid to and from the fluid chamber 34.

Figure 2A:
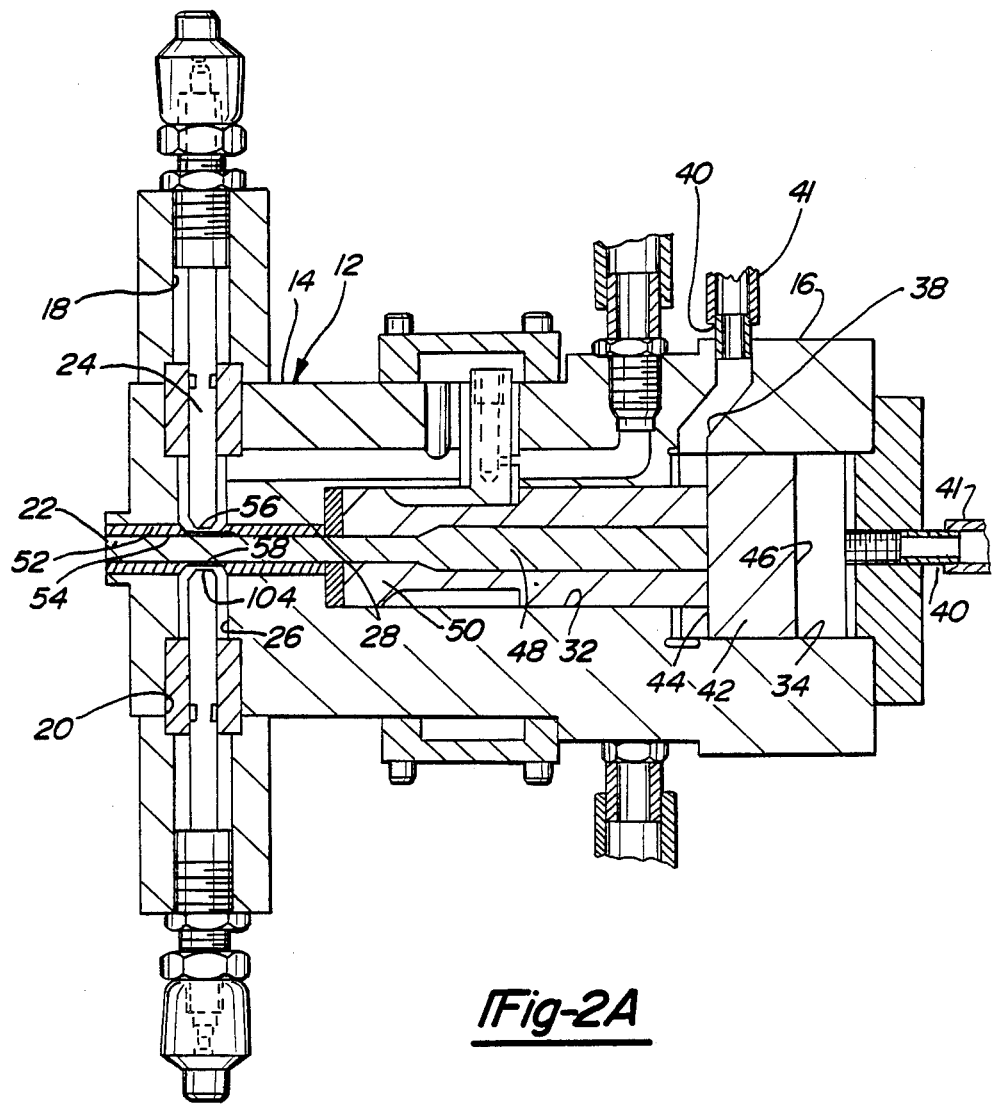
FIG. 2(a) is a cross-sectional view generally taken along line 2—2 of FIG. 1 showing the internal construction of the mixing head with the injection rod in the forward, injection position.
Figure 2B:
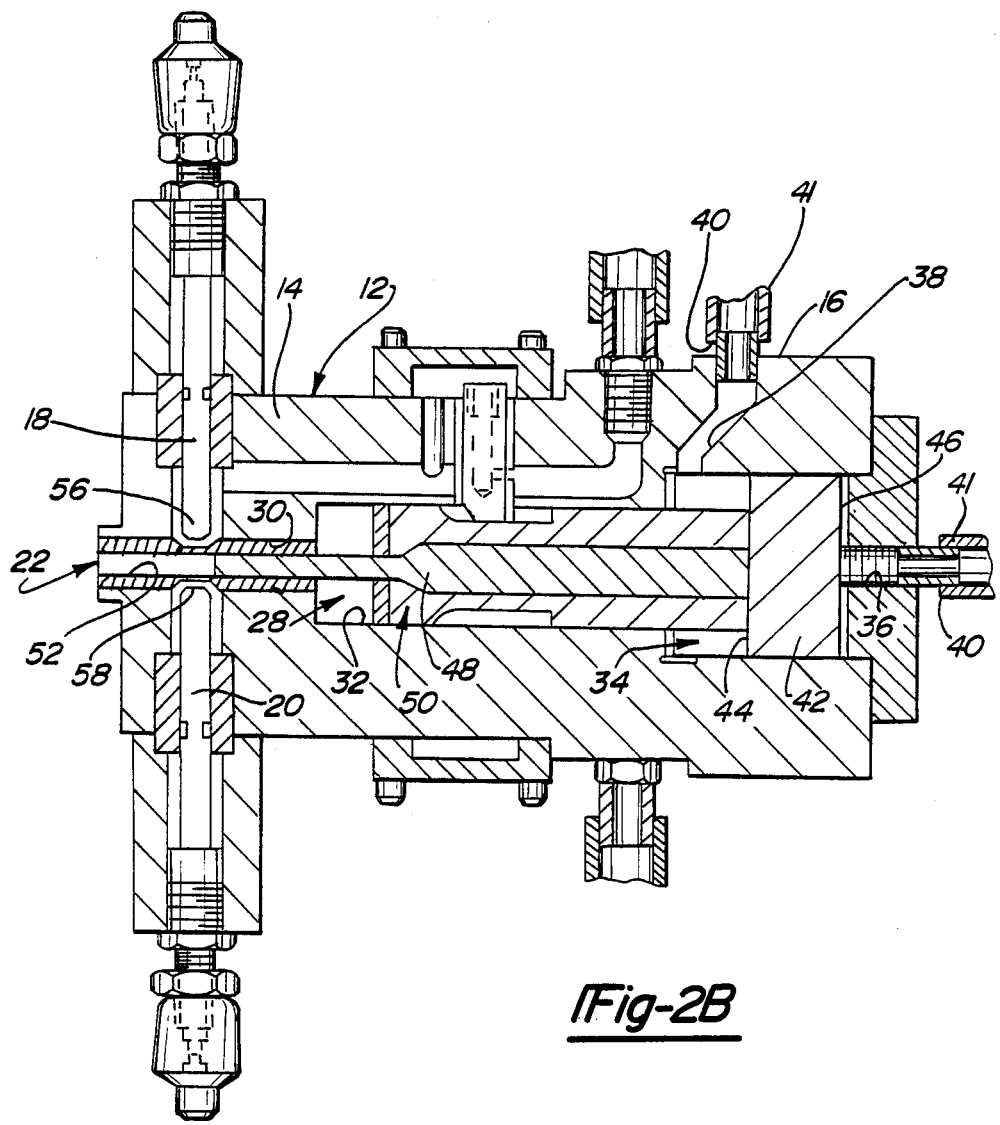
FIG. 2(b) is a cross-sectional view generally taken along line 2—2 of FIG. 1 to show the internal construction of the mixing head with the injection rod in the retracted position.

As shown in FIGS. 2(a) and 2(b), the inlet 36 and outlet 38 to the fluid chamber 34 are provided with suitable fittings 40 for connecting the inlet 36 and outlet 38 to conduits or hoses 41.

A piston 42 is reciprocally mounted within the fluid chamber 34. The piston 42 is in the form of a solid body having opposed faces 44 and 46. The inlet 36 and outlet 38 in the fluid chamber 34 are positioned on opposite sides of the piston 42 so as to enable pressurized fluid to be sequentially admitted and exhausted from the fluid chamber 34 on opposite faces 44 and 46 of the piston 42 to cause reciprocal movement of the piston 42 within the fluid chamber 34.

An elongated piston rod 48 is attached to one face 44 of the piston 42 and slidably extends through the first through bore 28 in the body 12. A cam member 50 is affixed to a portion of the rod 48.

A hollow sleeve 52 is mounted within the reduced cross-section portion 30 of the first through bore 28. The sleeve 52 is provided with a through bore 54 which forms a mixing chamber within the body 12. The outermost end of the piston rod or plunger 48 slidably extends through the sleeve 52.

First and second orifices 56 and 58, respectively, are formed in the side walls of the sleeve 52. The first and second orifices 56 and 58 are disposed in fluid flow communication with the first and second inlet passageways 18 and 20, respectively, to provide a fluid flow path for the fluid flow streams from the first and second inlets 18 and 20 in the body 12 through the first and second orifices 56 and 58 into the mixing chamber 54 wherein the fluid streams react to form a mixture which is to be injected through the outlet 22 of the body 12 into a mold cavity, not shown.

Figure 3:
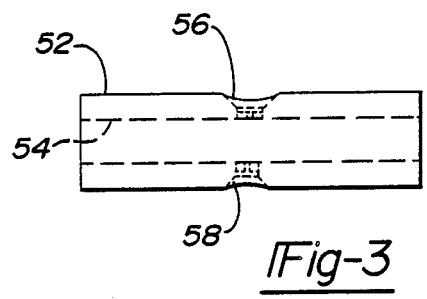
FIG. 3 is a partial, enlarged view of the sleeve and mixing plate assembly of the present invention.
Figure 4:
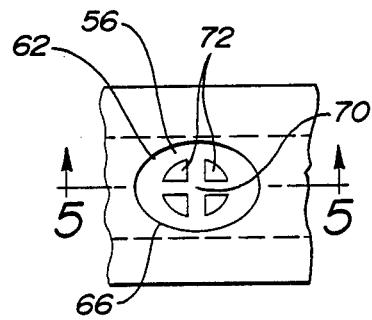
FIG. 4 is a cross-sectional view of an orifice in the sleeve of FIG. 3 showing the mixing plate therein.
Figure 5:
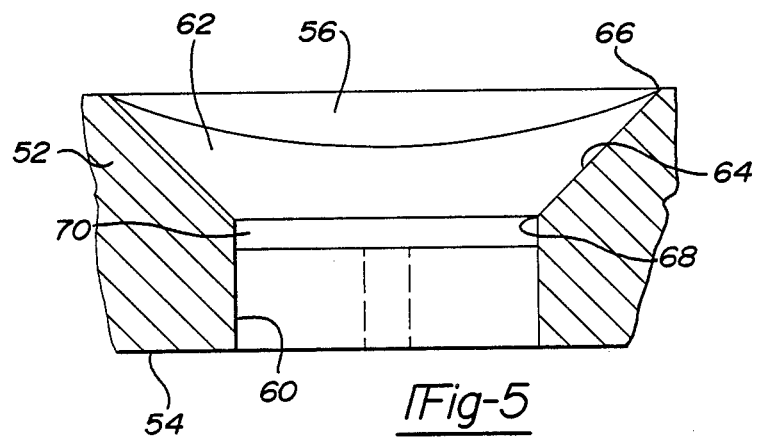
FIG. 5 is an enlarged view of the orifice of FIG. 3.

Referring to FIGS. 3, 4 and 5, there is shown an enlarged view of one of the identically constructed orifices such as orifice 56 in sleeve 52. Each of the orifices, such as orifice 56 is provided with a first portion 60 disposed in communication with the mixing chamber 54. The first portion 60 is a cylindrical channel contiguously connected with a second portion 62 having side walls 64. The outermost edge 66 of second portion 62 has an enlarged diameter. The outermost edge 66 is placed in communication with an associated inlet 18, 20. Side walls 64 taper inwardly from the outermost edge 66 to an inner edge 68 located at the junction between the first portion 60 and the second portion 62.

The orifice 56 has a mixing plate 70 associated with it. The mixing plate 70 is a grate spanning the cross-section of the orifice 56 and having a plurality of apertures or portals 72 circumferentially positioned therein. In the preferred embodiment, the mixing plate 70 is located in the first portion 60 of the orifice 56 adjacent to the junction between the first portion 60 and the second portion 62.

The portals 72 constitute between 25 and 75 percent of the surface area of the mixing plate. Thus, it can be seen that the mixing plate 70 of the present invention together with the second portion 62 of orifice 56 provide a constricted opening through which the pressurized liquid reactant stream must pass prior to entry into the mixing chamber 54.

The multi-portal plate 70 of the present invention breaks the reactant fluid stream into smaller individual streams and induces fluid turbulence as the reactant passes through it. When a reactant stream thus treated contacts a second reactant stream similarly treated a more thorough mixing results.

In the preferred embodiment, the portals 72 are arranged in plate 70 in a generally symmetrical fashion. Any number of portals 72 can be used. However, in the preferred embodiment, four circumferentially-shaped portals are arranged about the center of the plate 70 in a pie-like fashion.

In conjunction with FIGS. 2(a) and 2(b), a brief description of the operation of the mixing head will be provided. In FIG. 2(b), the piston 42 is shown in its first or retracted position within the fluid chamber 34. In this position, the outer most end of the rod 48 attached to the piston 42 has retracted within the first through bore to a position where it is spaced from the orifices 56 and 58. This opens the orifices 56 and 58 to the mixing chamber 54 and enables the flow of the fluid streams through the first and second inlet passages 18 and 20 past mixing plates 70, 72, into the mixing chamber 54. Because the streams are finely divided as they pass through the plates, mixing is more thorough and reaction more complete.

Reversal of the direction of pressurized fluid into the fluid chamber 34, such that the pressurized fluid is directed onto the face 46 of the piston 42, causes movement of the piston 42 and rod 48 within the fluid chamber 34 and the first through bore 28 in the body 12 to the position shown in FIG. 2(a). During such movement, the rod 48 will close the orifices 56 and 58 from the mixing chamber 54 and, concurrently, inject the mixture of the two fluid streams through the outlet 22 in the body 12 into the mold cavity, (not shown). Subsequent retraction of the piston 42 by direction of pressurized fluid against face 44 of the piston 42 will reverse the above-described sequence to enable the next mixture to be formed within the chamber 54.

In summary, there has been disclosed a unique mixing plate injection molding machine. The mixing plate of the present invention introduces fluid turbulence into the reactant streams providing thorough mixing as the streams come into contact with each other. This eliminates the need for any aftermixers or additional mixing apparatus prior to entry of the stream into the mold. Since the mixing action is induced at the point at which the stream enters the mixing chamber, prior to coming in contact with the other reactants, the chances of fouling of the device are greatly reduced.

We claim:

1. An injection molding mixing head for producing a chemically reactive mixture of at least two fluid streams comprising:
   a body having a plurality of inlets and an outlet;
   a first through bore formed in the body;
   a hollow sleeve mounted within the first through bore and defining a mixing chamber therein, the mixing chamber being disposed in communication with the outlet of the body;
   a plurality of orifices formed in the sleeve and communicating through the sleeve with the mixing chamber, each orifice comprising:
   (a) a first portion disposed in fluid communication with the mixing chamber, the first portion being a cylindrical channel; and
   (b) a second portion contiguously connected to the first portion, the second portion having continuously outwardly tapered side walls;
   a plurality of reactant passageways, each passageway extending through the body and connecting an associated orifice and an associated inlet in fluid flow communication for the flow of the fluid stream into the mixing chamber;
   a mixing plate positioned circumferentially across each orifice at the junction of the first and second portions thereof, each mixing plate having a plurality of apertures positioned thereon;
   piston means reciprocally mounted within a fluid chamber formed within the body, the piston means having a pair of opposed faces;
   a rod slidably disposed within the mixing chamber, the rod having the same cross-section as the mixing chamber, the rod having a first end and a second end, the first end attached to the piston means;
   pressurized fluid inlet and outlet means formed within the body in fluid flow communication with the fluid chamber for sequentially admitting and exhausting pressurized fluid from opposed faces of the piston means to cause reciprocal movement of the piston means and rod attached thereto from a first position within the mixing chamber thereby opening the first and second orifices to the mixing chamber for fluid stream flow from the first and second passageways into the mixing chamber to a second position in which the piston rod closes off the first and second passageways from the mixing chamber to stop the flow of fluid streams into the mixing chamber and, concurrently, ejects the chemically reactive mixture of the first and second fluid streams in the mixing chamber through the outlet in the body.

2. The mixing head of claim 1 wherein the mixing plate apertures comprise from about 25 to about 75 percent of the surface area of the mixing plate.

3. The mixing head of claim 2 wherein the mixing plate apertures are circumferentially disposed about the edge of the mixing plate.

4. An injection molding mixing head for producing a chemically reactive mixture of at least two fluid streams comprising:
   a body having a plurality of inlets and an outlet;
   a first through bore formed in the body;
   a hollow sleeve mounted within the first through bore and defining a mixing chamber therein, the mixing chamber being disposed in communication within the outlet of the body;
   a plurality of orifices formed in the sleeve and communicating through the sleeve with the mixing chamber, each orifice comprising;
   (a) a first portion disposed in fluid communication with the mixing chamber, the first portion being a cylindrical channel; and
   (b) a second portion contiguously connected to the first portion, the second portion being continuously outwardly tapered side walls;
   a plurality of reactant passageways, each passageway extending through the body and connecting an associated orifice and an associated inlet in fluid communication for introduction of an associated fluid stream into the mixing chamber;
   a mixing plate having a surface area disposed at the junction of the first and second portions of each orifice, the mixing plate having a plurality of circumferentially spaced apertures comprising from about 25 to 75 percent of the surface area of the mixing plate positioned thereon;
   piston means reciprocally mounted within a fluid chamber formed within the body, the piston means having a pair of opposed faces, the piston means also having a piston rod attached thereto for movement therewith; and
   pressurized fluid inlet and outlet means formed within the body in fluid flow communication with the fluid chamber for sequentially admitting and exhausting pressurized fluid from opposed faces of the piston means to cause reciprocal movement of the piston means and rod attached thereto from a first position within the mixing chamber thereby opening the first and second orifices to the mixing chamber for fluid stream flow from the first and second passageways into the mixing chamber to a second position in which the piston rod closes off the first and second orifices from the mixing chamber to stop the flow of fluid streams into the mixing chamber and, concurrently, ejects the chemically reactive mixture of the first and second fluid streams in the mixing chamber through the outlet in the body.

* * * * *